United States Patent [19]  [11] 3,865,386
Wilke [45] Feb. 11, 1975

[54] OIL SEALING DEVICE
[75] Inventor: Raud A. Wilke, Brookfield, Wis.
[73] Assignee: Koehring Company, Milwaukee, Wis.
[22] Filed: Apr. 20, 1973
[21] Appl. No.: 353,077

[52] U.S. Cl............ 277/187, 277/205, 277/207 R, 251/DIG. 1
[51] Int. Cl............................................. F16j 15/00
[58] Field of Search........ 277/207 R, 187, 166, 205, 277/208, 225; 251/DIG. 1, 324

[56] References Cited
UNITED STATES PATENTS
3,017,190  1/1962  Lindstrom...................... 277/187 X Primary Examiner—Samuel B. Rothberg
Attorney, Agent, or Firm—James E. Nilles

[57] ABSTRACT

An oil sealing device for shafts and other cylindrical objects such as valve spools, characterized by an inner annular portion comparable to an O-ring, and a concentric outer annular portion which provides a gasket. The inner seal portion is adapted to be stretched over a shaft or valve spool to have sealing engagement with the exterior thereof, while the gasket portion is adapted to be clamped between opposing surfaces which are substantially normal to the ring axis to prevent leakage of fluid past the exterior of the inner seal portion.

1 Claim, 6 Drawing Figures

PATENTED FEB 1 1 1975　　　　　　　　　　　　　　　　3,865,386
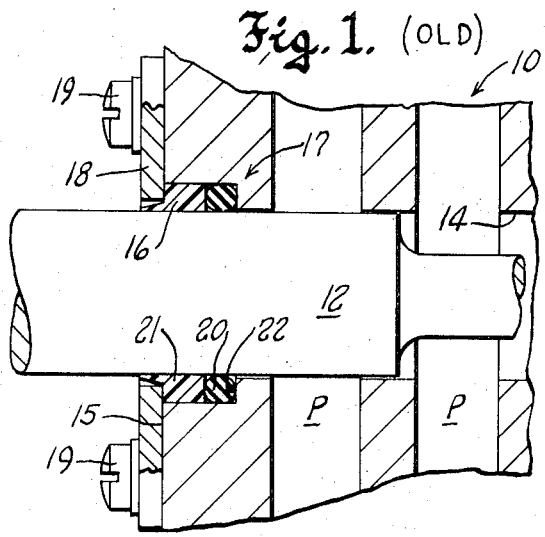
Fig. 1. (OLD)
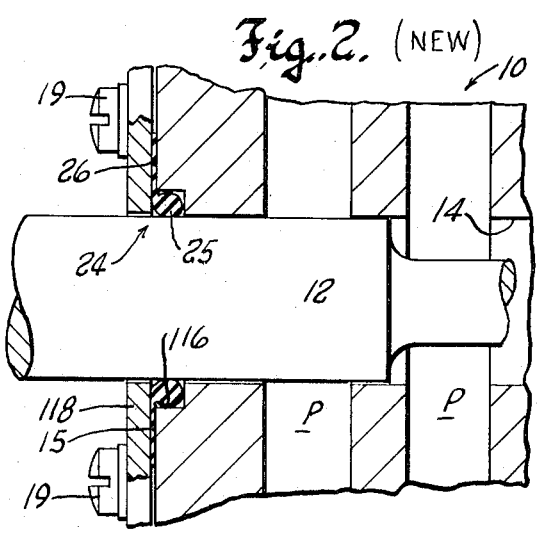
Fig. 2. (NEW)
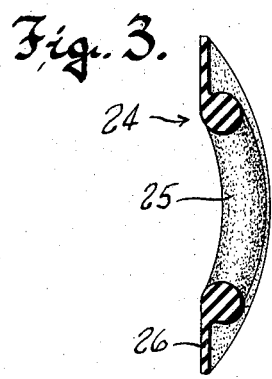
Fig. 3.
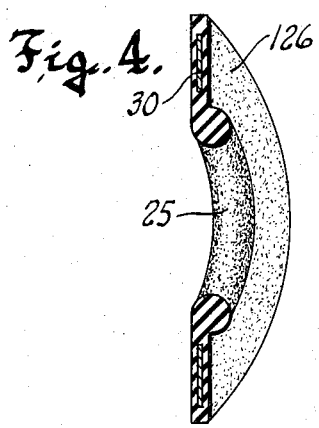
Fig. 4.
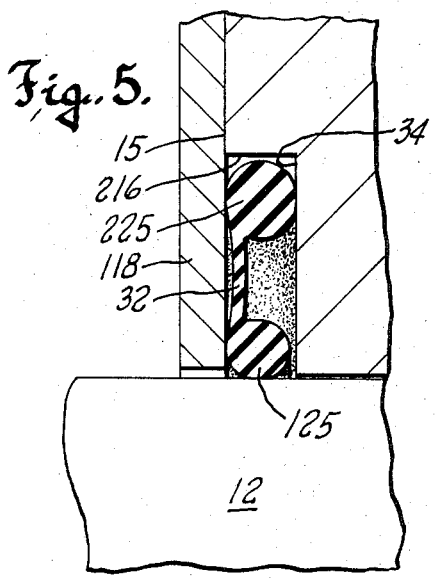
Fig. 5.
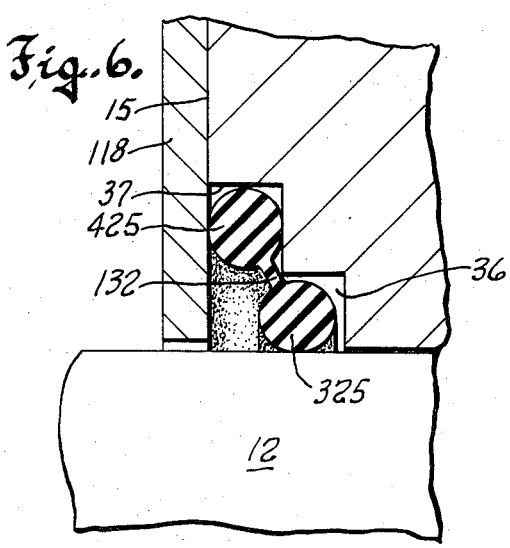
Fig. 6.

OIL SEALING DEVICE

This invention relates to fluid sealing devices generally, and it has more particular reference to oil seals such as are confined in a counterbore of a housing structure in sealing engagement with the exterior of a shaft or other cylindrical object having one end portion disposed in the counterbore.

There are many different structures in which oil seals of this nature are useful. However, they are especially important in hydraulic valves of the type having a cylindrical control element movably mounted in a bore in the body of the valve, to prevent leakage of hydraulic fluid along the exterior of the control element to the exterior of the body.

It has been conventional practice to seal the control element, for example the axially slidable valve spool of a hydraulic control valve, by means of an O-ring tightly confined in a counterbore in the valve body under substantial axial and radial forces. These forces were applied through the medium of an annular wiper confined in the mouth of the counterbore and a so-called seal plate which was secured to the exterior of the valve body by screws or the like and exerted axial force on the wiper to squeeze the ring against the bottom of the counterbore.

In this way, the axial forces imposed on the O-ring expanded its section in opposite radial directions to thereby assure sealing engagement of its exterior with the cylindrical wall of the counterbore and its interior with the exterior of the valve spool. As a result, hydraulic fluid could not escape to the exterior of the valve body past either the interior or the exterior of the O-ring.

An example of such a conventional oil sealing arrangement for a hydraulic control valve can be found in my U.S. Pat No. 3,575,212, issued Apr. 20, 1971.

While such oil seals were quite effective in preventing leakage of fluid to the exterior of the valve body, they have been found to be particularly objectionable in hydraulic control valves having an axially movable control spool, because of the drag the O-ring imposes upon the spool to resist actuation thereof out of its neutral position. This drag has been of such magnitude in past control valve structures as to substantially offset other measures that have been resorted to in an endeavor to produce a control valve with a spool that can be actuated with a minimum of effort.

To illustrate, in a conventional hydraulic control valve having a 1-inch diameter spool, the O-ring seal therefor is ordinarily so tightly squeezed in its counterbore as to require a force on the spool of from 20 to 25 pounds in order to move it axially out of neutral. This force must be at least equalled by the return spring acting upon the valve spool, with the result that at least 50 pounds of force is required to move the spool out of neutral.

However, substantially greater axial forces may act upon the spool to resist such actuation thereof. These are the axial momentum or reaction forces which are created as an incidence to flow of high pressure fluid past the ends of the lands on the valve spool, to or from the bore in which the spool operates. These forces are at peak values as the spool is initially moved out of neutral, or is in a position displaced only slightly from neutral; and they diminish with movement of the spool toward full operating positions at either side of neutral.

It is not unusual for these axial momentum or reaction forces on the spool to attain values of 60 or 70 pounds, or more; and they will vary depending upon the nature of the throttle notches in the ends of the valve spool through which high pressure fluid is constrained to flow as the spool is initially moved out of its neutral position.

For example, if an axial reaction force of 60 pounds is imposed on the spool as it is shifted away from neutral, that force must be added to the aforementioned 50 pound O-ring and return spring drag on the spool with the result that the spool break-away force can easily reach a value as high as 120 pounds.

This excessively high force can be drastically reduced if the throttle grooves in the lands on the valve spool are formed in accordance with the teachings of my U.S. Pat. No. 3,729,026, issued Apr. 24, 1973. The grooves therein disclosed minimize the axial momentum or reaction forces produced as a result of flow of high pressure fluid through the grooves as the spool is moved out of neutral; and they can effect a reduction in the axial momentum forces down to about 10 or 12 pounds, from the 60 or 70 pound figure characteristic of conventional throttle grooves. However, this still leaves an objectionably high spool breakaway force of 60 to 65 pounds.

With this in mind, it is the primary objective of this invention to effect a significant further reduction in the force required to actuate the valve spool of a hydraulic control valve.

More specifically, it is the purpose of this invention to effect a substantial reduction in the force required to actuate the spool of a hydraulic control valve by means of an improved oil seal for the spool.

In this respect, it is an object of the invention to provide an oil seal for shafts, valve spools and the like which will be highly effective but will exert minimum drag upon the shaft or spool.

In a specific sense, it is an object of this invention to provide an oil seal comprised of an inner ringlike member to have sealing engagement only with the exterior of a valve spool encircled thereby, and having an integrally formed gasket which can be clamped between the exterior of the valve housing and a seal plate to prevent leakage of oil past the exterior of the ring.

It is a further object of this invention to provide an improved oil seal for the valve spools of hydraulic control valves and the like, which is constructed in such a way as to require little or no modification of the control valve structure from the conventional; and which can, moreover, eliminate the wiper formerly used with such seals.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

The accompanying drawing illustrates several complete examples of the embodiments of the invention constructed according to the best modes so far devised for the practical application of the principles thereof, and in which:

3

FIG. 1 is a fragmentary sectional view of a hydraulic control valve showing a conventional oil seal for the spool thereof;

FIG. 2 is a sectional view similar to FIG. 1 but illustrating an oil seal of this invention in place in the body of the valve;

FIG. 3 is a view partly in section and partly in perspective, of the oil seal shown in FIG. 2;

FIG. 4 is a view of an oil seal similar to that seen in FIG. 3 but illustrating a modification thereof; and FIGS. 5 and 6 are fragmentary cross sectional views showing further modifications of the invention.

Referring now to FIG. 1 of the accompanying drawing, the numeral 10 generally designates the body of a conventional hydraulic control valve of the type disclosed in my aforementioned U.S. Pat. No. 3,575,212. The valve has a cylindrical control spool 12 which is axially slidably received in a bore 14 in the body.

The bore opens to one exterior side 15 of the body through a counterbore 16. An oil seal generally designated 17 is confined within the counterbore by means of a so-called seal plate 18 which is secured to the body as by screws 19.

The oil seal comprises an O-ring 20 of rubberlike material, and a rigid annular plastic wiper 21. Both the O-ring and the wiper encircle the valve spool, and while the O-ring is confined in the bottom of the counterbore 16, the wiper is interposed between the O-ring and the underside of the seal plate 18.

With the arrangement described, the O-ring 20 functions to prevent leakage of fluid along the periphery of the valve spool to the exterior of the valve body because it has sealing engagement with both the periphery of the valve spool and with the cylindrical side wall of the counterbore in which the ring is mounted.

For that purpose, the wiper 21 must have an axial length such that it will tightly squeeze the O-ring 20 against the bottom 22 of the counterbore when the seal plate is secured to the valve body. It is also important to have the O-ring dimensioned so as to normally fit reasonably close within the radial space between the valve spool and the side wall of the counterbore.

Thus, securement of the seal plate to the valve body so squeezes and bulges the O-ring section as to force its exterior radially outwardly into sealing engagement with the side wall of the counterbore and to force its interior radially inwardly into sealing engagement with the periphery of the valve spool. Since the ring is confined under axial compressive force between the inner end of the wiper and the bottom of the counterbore, its opposite sides will thus also have sealing engagement with the bottom of the counterbore and with the inner end of the wiper.

Tests have now shown that such confinement of the O-ring in its counterbore is responsible for much of the drag upon the valve spool which makes it necessary to exert objectionably high axial forces thereon in order to shift it endwise out of its neutral position to an operating position at one side or the other of neutral.

The present invention provides a greatly improved oil seal for the spools of control valves and for shafts generally, in that it produces only a slight amount of drag on the shaft or spool. As seen best in FIGS. 2 and 3, one form of sealing device 24 of this invention comprises an annular inner member 25 comparable to an O-ring, and an outer member 26 which is like a flange and serves as a gasket.

4

The gasket member 26 is substantially flat and is joined to the ring shaped inner member 25 with a fluid tight joint that extends entirely therearound. It lies in a plane substantially normal to the axis of the ring shaped inner member 25, and it is adapted to be clamped between the underside of a conventional seal plate 118 and the outer side 15 of the valve body 10. The gasket portion 26 is shown by way of example as being joined to one axial face of the ring shaped inner member 25; and in any event, it and the inner member 25 preferably comprise a one-piece molding of rubberlike material.

The ring shaped inner member 25 has an outer diameter which is less than that of the side wall of the counterbore 116 in which it is housed, and its inner diameter is also less than the diameter of the valve spool 12. It is adapted to fit freely within the counterbore 116, without a wiper such as shown at 21 in FIG. 1. Hence, the counterbore 116 can, if desired, be only slightly deeper than the axial dimension of the ring shaped inner member 25.

According to this invention, the ring shaped inner member 25 must be of such size with respect to the valve spool as to require stretching of said member to a larger dimension in order to fit it on the valve spool. This tensions the ring so that when it is in place on the spool, it will hold itself in sealing engagement with the exterior of the valve spool solely by its tendency to contract under circumferential tension therein. An effective fluid tight seal between the inner surface of the ring shaped member and the periphery of the spool is thus assured.

It is important to observe that no other portion of the ring shaped inner member 25 need engage any of the walls of the counterbore 116 in which it is received; nor need the ring have sealing engagement with the seal plate 118 which closes the mouth of the counterbore.

It is also of the utmost importance to note that clamping of the gasket portion 26 of the sealing device between the seal plate 118 and exterior of the valve body can be accomplished without subjecting the ring shaped inner member 25 to axial or radial forces such as might tend to wedge it against bottom and/or side wall surfaces of the counterbore 116. Such wedging of the ring was what had been relied upon previously, by securement of the seal plate to the valve body, and resulted in excessive drag on the valve spool due to the tight confinement of the O-ring seal radially between the spool and the cylindrical wall of the counterbore.

As seen in FIG. 2, however, the O-ring like inner member 25 can be entirely free of the encircling wall of the counterbore and of the bottom wall thereof. Its inner surface, however, is in firm sealing engagement with the exterior of the valve spool to prevent seepage of hydraulic fluid along said exterior surface of the spool to the exterior of the valve body.

Any hydraulic fluid from passages P in the valve body that leaks along the exterior of the spool and enters the bottom portion of the counterbore 116 can pass over the exterior portion of the O-ring like inner member 25. The gasket portion 26 joined thereto, however, will effectively prevent any leakage fluid in the counterbore from passing out through the mouth thereof to the exterior of the valve body.

In fact, the presence of leakage fluid in the counterbore at the exterior of the ring shaped inner seal member 25 can, if it is under pressure, tend to more firmly press the inner seal member onto the valve spool. This tendency will be minimized, however, since the passage P closest to the sealing device is usually at low or reservoir pressure when the valve is connected in a hydraulic circuit.

In comparison, it will be seen that the "old" oil seal of FIG. 1 comprises an O-ring that must effect sealing at both its internal and external surfaces, and for that purpose, it must be held under axial compressive force sufficient to cause the ring to bulge — both radially inwardly and outwardly. With the improved oil seal of this invention, however, the ring-like inner seal member 25 sealingly engages only the periphery of the valve spool, and it does so solely by reason of the circumferential tension introduced into the ring when it is stretched to fit it over the spool.

Nor does clamping of the outer gasket portion 26 of the sealing device impose any force upon the inner ring portion 25. As a result, the counterbore 16 in the valve body can, if desired, be dimensioned exactly the same as with conventional seal constructions. However, because a wiper such as seen as 21 in the old oil seal arrangement is no longer needed, the counterbore 116 can be made considerably shallower, as the inner ring shaped portion of the seal will ordinarily be located therein near the underside of the seal plate 18.

The oil sealing device seen in FIG. 4 also comprises a one-piece molding of rubber-like material and is like that just described except that its outer gasket defining portion 126 has a thin sheet metal washer 30 embedded therein. The washer adds a degree of rigidity to the gasket portion which facilitates handling and assembly of the sealing device. It has no other function.

The sealing device seen in FIG. 5 comprises O-ring like inner and outer seal members 125 and 225, respectively, joined together in concentric relation by means of a thin web 32 molded integrally therewith. In this case, the counterbore 216 in the valve body must be made larger in diameter in order to accommodate both seal members.

If the counterbore 216 has uniform depth, the outer O-ring like seal member 225 should have a slightly larger cross section than that of the inner ring shaped member 125. This is essential inasmuch as the outer ring shaped member must be firmly clamped between the underside of the seal plate 118 and the bottom 34 of the counterbore 216 to thus prevent leakage of hydraulic fluid past the exterior of the inner ring shaped member 125 and out of the mouth of the counterbore.

It will be seen, therefore, that the outer ring shaped seal member 225 acts as a gasket in substantially the same way as the outer flange like portion 26, 126 of the earlier described embodiments of the invention.

It will also be understood that both the inner and the outer ring shaped seal members can have cross sections of the same diameter if the bottom of the counterbore 216 is stepped and shallower near the side wall thereof.

A counterbore of that type, though more markedly stepped, is illustrated in FIG. 6. As therein seen, the radially inner portion 36 of the counterbore has considerably greater depth than the radially outer portion 37 of the counterbore. The oil sealing device in this case also comprises integrally molded inner and outer seal members 325 and 425, respectively, and a substantially thin web 132 which is integrally joined therewith and holds the same in concentric relation to one another.

As in the FIG. 5 embodiment, the inner and outer seal members are also in substantially the shape of O-rings; and the outer ring is clamped axially against the bottom of the shallow portion 37 of the counterbore by the seal plate 118.

Again in this instance, the inner sealing ring 325 is freely received in the counterbore and is sealingly engaged with the exterior of the valve spool solely by its tendency to contract under the circumferential tension introduced thereinto during stretching of the ring over the spool. The outer sealing ring 425 again serves as a gasket to prevent leakage of hydraulic fluid that may pass around the exterior of the inner ring from flowing out of the mouth of the counterbore to the exterior of the valve body.

It should be understood, of course, that the device of this invention is useful as an oil seal in structures other than hydraulic valves; for example to prevent seepage of oil along the exterior of an axially slidable or rotatable shaft.

From the foregoing description, together with the accompanying drawing, it will be readily apparent to those skilled in the art that this invention provides an oil sealing device which has many advantages over those available previously, especially when used with hydraulic control valves.

Those skilled in the art will appreciate that the invention can be embodied in forms other than as herein disclosed for purposes of illustration.

The invention is defined by the following claims:

1. In a hydraulic device including a body with a bore that opens to an outer side of the body through a counterbore, a plate secured to said side of the body to partially close the mouth of said counterbore and having an aperture coaxial with the bore, and a cylindrical valve spool slideable axially in the bore with one end projecting through the counterbore and said aperture to the exterior of the body at said side thereof, said aperture being of such diameter that it encircles said spool, the improvement which comprises: a sealing device of resilient material having an inside diameter smaller than the outside diameter of said spool and an outside diameter smaller than the diameter of said counterbore, said sealing device being disposed in said counterbore and having a radially inner ring shaped member movable in sealing engagement at an inner surface with the exterior of the spool, said inner ring shaped member abuttable against said plate and a radially outer ring shaped seal member which encircles the spool and is clamped between said plate and a surface in said counterbore in radially outward relation to the inner ring shaped member while said inner member is not clamped; said outer seal member being integrally connected by a web which is axially offset in respect to said inner and outer members to the inner member as a fluid tight joint that extends circumferentially entirely around the inner member whereby said inner member can slide axially relative to said spool and against said plate.

* * * * *